Patented Feb. 27, 1951

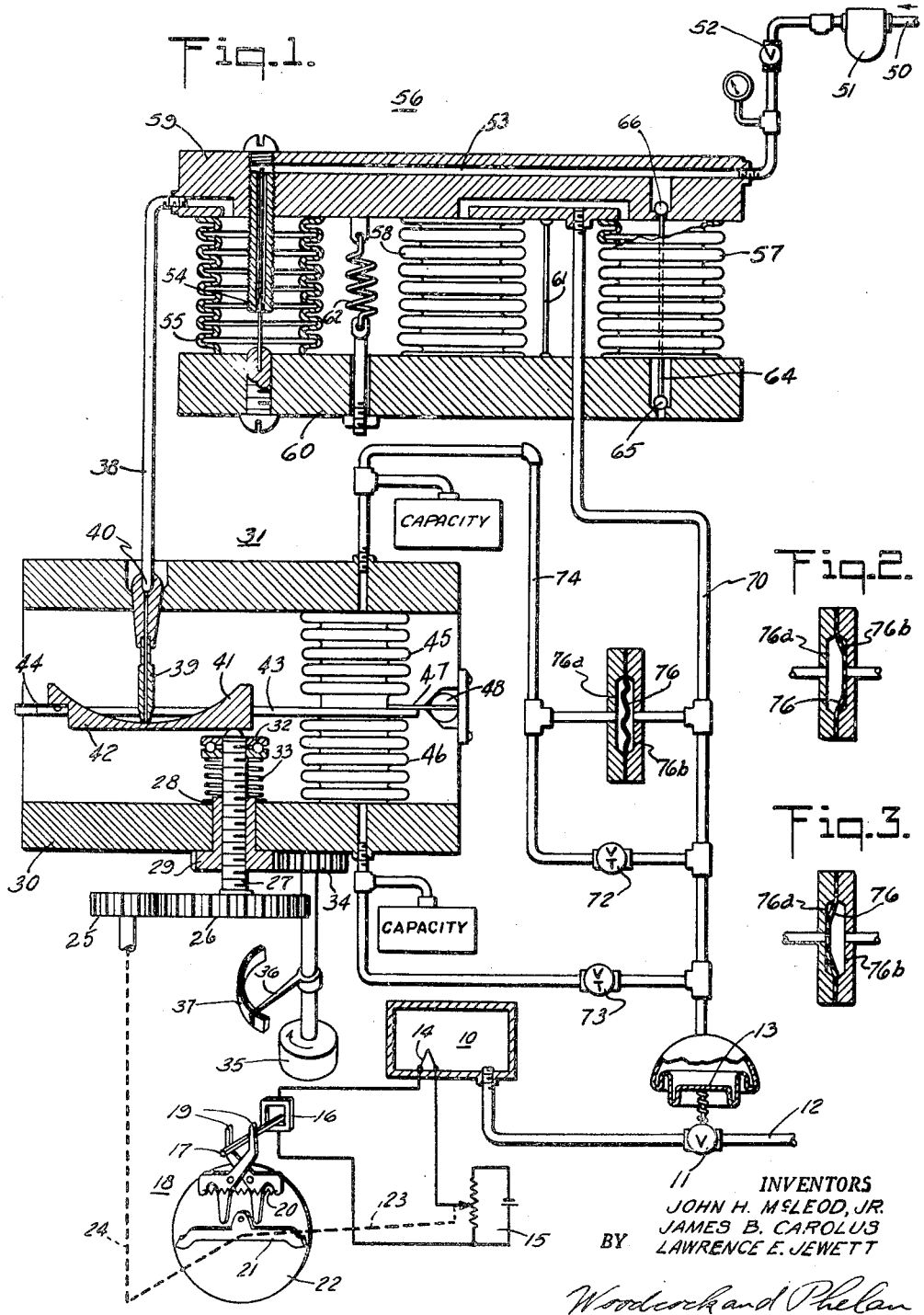

2,543,120

UNITED STATES PATENT OFFICE 2,543,120

STABILIZER FOR PNEUMATIC CONTROLS

John H. McLeod, Jr., Oxnard, Calif., and James B. Carolus, North Hills, and Lawrence E. Jewett, Springfield, Pa., assignors to Leeds and Northrup Company, Philadelphia, Pa., a corporation of Pennsylvania Application September 22, 1948, Serial No. 50,624

7 Claims. (Cl. 236—82)

This invention relates to pneumatic or electro-pneumatic controllers of the type used for control of the magnitude of a controlled or measured variable, quantity or condition, such as temperature, pH values, rate of flow or other physical, chemical or electrical condition, and has for an object the provision of a pneumatic or electro-pneumatic controller in which there is provided a damping feature to minimize oscillations otherwise arising during the operation of the controller.

Pneumatic or electro-pneumatic controllers of the type to which the present invention is applicable are disclosed in Stein et al. Patent 2,285,540 and in copending application, Serial No. 747,925, filed May 14, 1947, now Patent No. 2,507,606.

In carrying out the invention in one form thereof, there is provided a means responsive to a change in the direction of the differential pressure in the system as characteristically occurs in the case of oscillation. In a preferred embodiment of the invention, such means may take the form of an exceedingly flexible diaphragm bisecting a chamber and movable between fixed stops, or from one wall to an opposing wall, the operation of which is determined by the characteristics of the pneumatic control of which it is a part.

For further objects and advantages of the invention and for a detailed description and further novel features, reference is to be had to the following description taken in conjunction with the accompanying drawings, in which:

Fig. 1 diagrammatically illustrates the invention as incorporated in a control system disclosed and claimed in aforesaid Patent No. 2,507,606; and Figs. 2 and 3 are sectional views of the oscillation-suppressive device with its diaphragm respectively in opposite limiting-positions.

Referring to the drawings, the controller for purpose of explanation is illustrated as employed for control of the temperature of a furnace 10 though, as previously set forth, it is applicable to the control of any measured variable by regulation of the supply of an appropriate agent. As shown, the measured variable, the temperature of the furnace 10, is varied by changing the position of a control valve 11 connected in a fuel supply line 12. The valve 11 may be positioned by variation of the pressure applied to a diaphragm 13 to move it against the force of an opposing spring. Other suitable pneumatic mechanism for control of the valve may be substituted therefor. The temperature of the furnace may be measured by any suitable means; in the system shown it comprises a measuring circuit, including a thermocouple 14 suitably positioned in the furnace and electrically connected to a potentiometer 15 and to a galvanometer coil 16.

There is symbolically illustrated a measuring instrument or mechanical relay 18 operable under the control of the galvanometer 16, of the type disclosed in Squibb Patent 1,935,732. A detailed description of the operation of such a relay will be found in the Squibb patent. Briefly, the deflection of the galvanometer coil 16 in one direction or the other positions the pointer 17 between a pair of feeler members, 19, 19. By a suitable cam mechanism the feeler members are released for operation by a spring 20 to position a clutch member 21 with reference to a disc 22 in accordance with the deflection of the pointer 17. After deflection of the clutch member 21 it is moved into engagement with the disc 22. Thereafter, restoring cams return the clutch member 21 to the position illustrated and, at the same time, rotate the disc 22 and the shaft, diagrammatically indicated by the broken lines 23 and 24, in accordance with the deflection of the galvanometer pointer.

The slidewire of the potentiometer 15 is adjusted in a direction to rebalance the measuring circuit, and concurrently a gear 25 in mesh with a gear 26 rotates a screw 27 in one direction or the other, depending upon whether the temperature in the furnace has risen above or fallen below its previous level. The control screw 27 is carried by the internally threaded hub 28 on a gear 29, the hub extending through a frame 30 of the pilot device 31. To the end of the screw 27 is secured one element of a thrust bearing 32, the other element of which has bearing against it one end of spring 33. The opposite end of the spring bears against the frame 30 and, thus, axially maintains the gear 29 against the frame 30 and eliminates axial backlash between the screw 27 and the threaded hub 28, and between the gear 29 and the frame 30. The gear 29 meshes with a gear 34 which may be manually rotated by a knob 35 in selection of a desired control point, as determined from the position of a pointer 36 with reference to a suitably calibrated scale 37.

Thus the position of the control screw 27 is varied in correspondence with the changes in furnace temperature, and the relative position of screw 27 and hub 28 depends upon the deviation of the existing temperature from the selected control point.

Air is delivered by pipe 38 to the nozzle 39 of the pilot device 31, which nozzle is adjustable about a pivotal axis 40 with reference to the curved surface 41 of a baffle 42. The baffle 42 has one end thereof supported on or by the rounded end of the control screw 27, while the opposite end thereof is connected to one end of a lever 43 by means of a leaf-spring hinge 44. Thus, either end of the baffle 42 may be rotated about an axis adjacent the other end thereof. Near the end of the lever 43 remote from baffle 42 and bearing against it from opposite sides thereof are the negative feedback bellows 45 and the "reset" or positive feedback bellows 46. The said opposite end of the lever 43 is connected by a leaf spring 47 to a supporting member 48.

As will hereinafter appear, the present invention is principally concerned with maintenance of the stabilizing action of the negative feedback.

The air flowing to the passage 38 comes from any suitable source such as a supply pipe 50, a filter 51, a valve 52, a passageway 53 and a restriction 54 which may be located within a bellows 55. The bellows 55 forms a part of a pneumatic relay or booster 56, which also includes bellows 57 and 58. All three bellows are mounted between a stationary base 59 and a movable plate 60, pivotally supported from the base member 59 as by a flexible hinge or leaf spring 61. Bellows 57 and 58, of substantially the same effective area, are mounted on opposite sides of the flexible hinge 61, bellows 57 being at a somewhat greater distance from the hinge 61 than bellows 58. Bellows 58, which is pneumatically connected to bellows 57, is provided in order to decrease the effective moment of bellows 57 so that a desired ratio of pressure changes in bellows 55 to those in bellows 57 can be obtained with the use of bellows and lever arms of practical magnitude. An adjustable tension spring 62 is provided and is connected between stationary base 59 and movable plate 60. Extending through the bellows 57 is a valve-actuator 64. As shown, the lower valve 65 and the upper valve 66 are both closed. When the movable plate 60 is rotated in a counterclockwise direction, as by an increase in pressure in bellows 55, it opens the valve 66. When the plate 60 moves in a clockwise direction, as by a decrease in pressure in bellows 55, the valve seat is moved to open the valve 65 and to connect the bellows 57 to atmosphere.

In one embodiment of the invention a one-pound change of pressure applied to the bellows 55 required a ten-pound change in the common pressure applied to bellows 57 and 58 to balance it. The ratio, of the order of 10 to 1, is independent of the tension on the spring 62 which is utilized to preselect the magnitude of the output pressure on the diaphragm 13 for a particular setting of baffle 42 relative to nozzle 39.

In the system thus far described, an exceedingly small movement of the control screw 27 will produce movement of the agent-supply valve 11 from one extreme position to the other. In other words, the proportional band will be very narrow, resulting in an on-and-off operation of the valve 11. To provide proportional bands of appreciable widths and have a stable control system bellows 45 is flow connected to the line 70. The action of the bellows is to produce action of the lever 43 and the outer end of the baffle 42 in a direction to oppose the motion of the baffle 42 produced by motion of the control screw 27.

With an instrument including only the features thus far described, particularly with the addition only of the bellows 45, there would be present only proportional-position action; that is, action where there is continuous linear relation between the value of the controlled variable and the position of the final control element, the valve 11.

It should be noted that without the bellows 45 the system would function like an "on-and-off" control. The proportional band would be so narrow as to provide that kind of operation. In such a system, because of the on-and-off action, the measured variable would violently oscillate about the control point, specifically, the selected temperature to be maintained. The provision of the bellows 45 eliminates the oscillation of the measured variable but produces in the system a substantial offset or drooping characteristic. Because of the bellows 45, any change in the setting of the valve 11 requires that the thermocouple be maintained at a temperature higher or lower than that selected for the control point. Thus, if the temperature rises because of a decreased demand, as we have already assumed, the valve 11 can be maintained in a more nearly closed position to reduce the fuel to the furnace 10 only by maintaining the temperature of the thermocouple 14 at a somewhat higher value than that selected for the control point. Such an offset is required to produce the control action and is known as "droop." While the system including the bellows 45 provides a smoothly continuous change in the position of the valve 11, with changes in the controlled variable, the aforesaid droop is in most cases highly undesirable.

By providing the bellows 46, subjected to the same pressure as the bellows 45 but through a restriction, such as a throttle valve 73, there is eliminated the associated droop or offset, yet the system retains its inherent sensitivity as well as the other advantages incident to the use of the bellows 45.

To provide a "rate" control action there is included in the line to the bellows 45 a restriction shown as throttle valve 72. After a change in pressure to diaphragm 13 caused by primary control action, the restriction 72 has the effect of delaying negative feedback pressure to bellows 45. As the pressure in bellows 45 approaches that on diaphragm 13, due to fluid flow through restriction 72, the negative feedback action becomes fully effective and the "rate" action disappears. In other words, the effect of restriction 72 is transitory and self-extinguishing. However, if a constant rate of change of primary control action is established and maintained, the pressure drop across restriction 72 will assume a constant value having a continuously linear relation to said rate of change and an increment equal to this pressure drop will be added to or subtracted from the pressure on diaphragm 13 and a corresponding increment of displacement will be added to or subtracted from the position of valve 11. The effect described will be recognized by those skilled in the art as "rate" action. It should be understood that though restriction 72 is adjustable, it must always be so adjusted that the pressure changes in bellows 45 occur at a faster rate than those in bellows 46, or instability will result from the positive feedback effect of bellows 46 which would then be greater than the stabilizing negative feedback effect of bellows 45. In all cases the desirable "rate"

action obtained by inclusion of restriction 72, undesirably reduces the stability of the controller as obtained from the negative feedback action of bellows 45.

In operation, it will be understood that a change in temperature of the furnace 10 results in an adjustment of the threaded member 27 with corresponding pivotal movement of the baffle 42. The pivotal movement of the baffle 42 causes a change in pressure in the line 38 and in the bellows 55. In consequence, the bellows 55 expands or contracts, depending on the direction of the pressure change, and opens or closes valve 66 or 65 to increase or to decrease the pressure in the line 70 leading to the line-operating diaphragm 13. Responsive to change in the pressure in the line 70, the pressure in the negative feedback bellows 45 changes in the same direction as in line 70 and tends to, and does, move the lever 43 in a direction to rotate the baffle 42 towards its original position prior to adjustment of the threaded member 27.

From the foregoing, it will be seen that except for the stabilizing action of the negative feedback the pressures in the system will be constantly changing over a substantial period though the end result in the control of the valve 11 will be to maintain a constant temperature within the furnace 10. Even with the bellows 45 or equivalent, the controller because of inclusion of rate-valve 72 may, and does, develop a tendency to instability: pressure oscillations develop which are undesired and which interfere with the maintenance of a predetermined or preselected temperature for the furnace 10.

To maintain the effectiveness of the negative feedback despite inclusion of valve 72 or equivalent to obtain a rate control action there has been provided means for preventing the aforesaid pressure oscillations. That means, in the particular form shown in Fig. 1, comprises a flexible diaphragm 76 dividing a chamber 76a flow-connected to the line 74, and a chamber 76b flow-connected to the line 70. For clarity, the diaphragm 76 has been shown in its mid-position in Fig. 1, though it is understood it will normally occupy an extreme position, as shown in Figs. 2 or 3, depending upon the previous history of operation of the system. The pressure difference across the diaphragm 76 will be the same as that across the rate-valve or restriction 72. When oscillation tends to develop in the system, there will be a reversal in the direction of the differential pressure across the rate-valve 72 and also across the diaphragm 76. If the direction of the differential pressure reverses, the diaphragm will move from one limit to the other limit, Figs. 2 and 3. The movement of the diaphragm from the position shown in Fig. 2 to Fig. 3, or vice versa, changes the volume of the proportional bellows system 45. The rapid change in that volume momentarily reduces the pressure difference between the output line 70 and that in the proportional bellows 45 and, hence, tends to prevent the oscillation. In brief and as later more fully explained, the restriction 72 within the limits of operation of diaphragm 76, or equivalent, is in a sense by-passed to maintain effectiveness of the negative feedback action of bellows 45.

Whenever the output pressure increases after a period of decrease, the diaphragm moves from the position shown in Fig. 2 to the position shown in Fig. 3 to raise the pressure in the negative feedback bellows 45 which, in turn, acts to decrease the output pressure and tends to bring the two systems to the same pressure. The action is immediate and does not require the delay which would otherwise follow from the flow of air through the restriction or rate-valve 72.

Further in accordance with the invention, the diaphragm 76 is preferably made of a material which is exceedingly flexible. It may be a thin sheet of a rubber-like synthetic plastic of vinyl-chloride (available on the market under the trade-name "Koroseal"). Such a material provides substantially perfect flexibility and functions as a frictionless inertia-free piston: movable from one limit to the other upon reversal of pressure-difference without intermediate positions dependent upon the magnitude of the pressure-difference. The action of the slack diaphragm should be distinguished from that of a usual metallic diaphragm or bellows or an elastic non-metallic diaphragm of substantial thickness, because they introduce into the system varying spring gradients with travel whose range is dependent upon the existing pressure-difference across the rate-valve 72.

It will now be assumed that a temperature change has occurred in the furnace 10 and that the pressure within the pipe 70 is changing in a direction to return the temperature to the control point as set by the knob 35, and that under the assumed conditions of operation the diaphragm 76 occupies the position shown in Fig. 3. If it be further assumed that the temperature change reverses to reverse the direction of the pressure change in the pipe 70, then it will be seen that there cannot occur a rate action as by flow of air through the rate-valve 72 until the stabilizer diaphragm 76 moves from the limit-position of Fig. 3 to the limit-position of Fig. 2. The force acting upon the diaphragm 76 to produce the movement between the two limits is the pressure difference across the rate-valve 72.

In a typical embodiment of the invention, the maximum pressure difference occurring is extremely small, generally less than .02 of a pound per square inch. As the diaphragm moves, it changes the volume of the system including the proportional bellows 45, and by the use of a diaphragm of suitably large area, a significant volume change can be attained though the pressure differential is small. Hence, upon such reversal of pressure differential across the valve 72, there will be a significant volume change in the system including bellows 45 rather than flow of air through the rate-valve 72. Once the limit of travel of the diaphragm is reached, full "rate" action again occurs by reason of the action of valve 72. However, the limits of travel of the diaphragm are such that the rate action is disabled over only a small portion of the proportional band; that is, only about .3% to .4%.

In typical embodiments of the invention, the volume of the output system components connected to chamber 76b may vary, in different systems, in capacity from a few cubic inches to five hundred or more cubic inches. The connecting tubing length, for example, may vary from six feet to six hundred feet or more, and its bore may vary from ⅛" to as much as ⅜" or more. The "rate" adjustment produced by the valve 72 may be variable in a ratio of about 400 to 1. Despite these wide differences, the diaphragm device has proved effective in prevention of self-oscillation.

The volume of the pneumatic system including the bellows 45 for a particular installation may be, and in general is, predetermined at the factory and, accordingly, the effect on the system of the movement of the diaphragm 76 from one limit-position to the other limit-position is known and accordingly the proper size of diaphragm 76 may be preselected. In a typical embodiment of the invention where the capacity of the system, including the bellows 45, and the orifice device 72 was of the order of five cubic inches, the diaphragm 76 preferably had a diameter of 1 3/16" and with a full stroke of 0.03"; that is, from one limit to the other. In this connection it will, in general, be desirable to provide a stroke approximately 100% greater than that which calculations would indicate as affording the desired change in volume, the difference probably being due to a wrinkled character of the diaphragm. While the dimensions of the diaphragm are not exceedingly critical, the foregoing are to be taken as suggestive, and it will be understood that the size of the diaphragm will be increased or decreased if the volume of the system, including the rate bellows 45, is larger or smaller than above set forth.

In summarizing the disclosure, it may be stated that the negative feedback, provided by bellows 45, is essential to a stable controller. The addition of rate-valve 72 produces a rate action but reduces the intensity of the negative feedback action. Such a system provides an inherently less stable controller with a tendency towards self-oscillation. To correct this, the addition of a chamber containing a frictionless inertia-free piston or slack diaphragm 76 in parallel with the rate-valve or restriction 72 tends to suppress any oscillatory effects which might be produced by the restriction and thus to restore the system to its original and desirable state as a stable controller.

As pointed out above, the present invention is also applicable to the pneumatic controller disclosed in Stein et al. Patent 2,285,540.

More specifically, in Fig. 1 of Patent 2,285,540 the rate-valve 72 in the present disclosure may be inserted in the line between bellows 24 and the junction of said line with pipe 31, thus providing "rate" action. To provide an oscillation-suppressive effect, one side of the chamber containing the slack diaphragm 76 of the present disclosure may be directly connected pneumatically to bellows 24 and the other side of said chamber may be directly connected pneumatically to chamber 32. Similar modifications may be made to the pneumatic controllers illustrated in Figs. 4 and 5 in the same patent.

While a preferred embodiment of the invention has been disclosed, it is to be understood that additional modifications may be made within the spirit and scope of the appended claims.

What is claimed is:

1. A control system for varying the supply of an agent to minimize deviation from a desired magnitude of a condition comprising a member movable in response to changes in magnitude of said condition, a pressure-responsive device for controlling the supply of said agent and subjected to pressure changes proportional to movement of said member, a pressure-responsive negative feedback device for stabilizing the position of said member independently of changes in supply of said agent, a flow-restriction device between said pressure-responsive devices to provide a "rate" control action and which undesirably reduces the stability of the system by producing a substantial movement of said pressure-responsive device upon occurrence of pressure changes of high rate even though of a small magnitude, and means for maintaining said stability despite said flow-restriction device comprising a chamber and a piston therein dividing said chamber into isolated compartments respectively pneumatically connected to said pressure-responsive devices, said piston between predetermined limits of movement within said chamber being freely movable from any position therebetween to either one or the other of said limits upon continued application thereto of the same minimum pressure-differential and movable in response to any pressure-differential across said flow-restriction device to effect in response to pressure changes applied to said first-named pressure-responsive device immediate compensatory change in pressure in said negative feedback device of the same order as of said small magnitude.

2. A control system for varying the supply of an agent to minimize deviation from a desired magnitude of a condition comprising a member movable in response to changes in magnitude of said condition, a pressure-responsive device for controlling the supply of said agent and subjected to pressure changes proportional to movement of said member, a pressure-responsive negative feedback device for stabilizing the position of said member independently of changes in supply of said agent, a flow-restriction device between said pressure-responsive devices to provide a "rate" control action and which undesirably reduces the stability of said system, and means for maintaining said stability despite said flow-restriction device comprising a chamber and a slack diaphragm therein dividing said chamber into isolated compartments respectively pneumatically connected to said pressure-responsive devices, said diaphragm for all of its positions between predetermined limits within said chamber being movable in either direction by the same minimum pressure-differential and movable in response to any pressure-differential across said flow-restriction device to effect immediate change in pressure in said negative feedback device in response to pressure changes applied to said first-named pressure-responsive device.

3. A control system for varying the supply of an agent to minimize deviation from a desired magnitude of a condition comprising a member movable in response to changes in magnitude of said condition, a pressure-responsive device for controlling the supply of said agent and subjected to pressure changes proportional to movement of said member, a pressure-responsive negative feedback device for stabilizing the position of said member independently of changes in supply of said agent, a flow-restriction device between said pressure-responsive devices to provide a "rate" control action and means delaying the "rate" control action for enhanced stability comprising isolated compartments respectively connected to opposite sides of said flow-restriction device and a slack diaphragm for complementarily varying the volume of said compartments in response to changes in the pressure-differential across said flow-restriction device, said diaphragm for every position between predetermined limits being movable in either direction by the same minimum pressure-differential.

4. In a control instrument, the combination with a fluid-conducting nozzle, a baffle having a flow-obstructing surface operatively associated with the open end of said nozzle for changing a fluid pressure, a pair of opposed bellows in operative relation with said baffle, one acting upon it in one direction and the other acting upon it in the opposite direction, fluid-flow connections to each bellows each connection including a flow restriction, condition-controlling means having a pressure-actuator, means for applying to said condition-controlling means a pressure varying in accordance with the changes of the aforesaid fluid pressure for automatically positioning said condition-controlling means, conduit means including one of said restrictions and interconnecting said pressure-actuator and one of said bellows, a chamber connected in parallel with said last-named flow restriction, and a diaphragm dividing said chamber into two parts and movable from one limit-position to a second limit-position to change the volume of a system including said last-named bellows, said diaphragm being characterized by that degree of flexibility which affords movement from one limit-position to the other limit-position upon occurrence of minute reversal of pressure-differences across said last-named restriction.

5. A control instrument comprising a fluid-conducting nozzle, a baffle having a flow-obstructing surface operatively associated with the end of said nozzle for changing a fluid pressure, a pair of opposed bellows in operative relation with said baffle, one acting upon it in one direction to provide negative feedback action and the other acting upon it on the opposite direction for droop correction, condition-controlling means operable by fluid pressure, a booster for applying to said condition-controlling means a pressure change determined by said nozzle but magnified with respect thereto for automatically positioning said condition-controlling means, a fluid-flow connection between each of said bellows and said pressure-operated condition-controlling means, each connection including a flow restriction, and means flow-connected in parallel with said flow restriction leading to said negative feedback bellows operable upon every change in the direction of the pressure drop across said flow restriction for directly and immediately applying to said last-named bellows a stabilizing pressure change comprising a flexible diaphragm movable from one limiting-position to a second limiting position and vice versa by the same minimum pressure-differential, one side being flow-connected to said negative feedback bellows and the other side being flow-connected to said condition-controlling means, said limiting-positions being separated by an amount predetermining the magnitude of said stabilizing pressure change.

6. A control instrument comprising a fluid-conducting nozzle, a baffle having a flow-obstructing surface operatively associated with the open end of said nozzle for varying a fluid pressure, a negative feedback bellows and a reset bellows in operative relation with said baffle, one acting to move it in one direction and the other acting to move it in the opposite direction, condition-controlling means operable by fluid pressure, means including a booster for applying to said condition-controlling means a pressure of magnitude determined by the relative positions of said nozzle and baffle for automatically positioning said condition-controlling means, a fluid-flow connection between said pressure-operated condition-controlling means and said negative feedback bellows including a flow restriction, and a chamber divided by a diaphragm connected across said restriction and movable into engagement with one or the other of opposing walls of said chamber, said diaphragm being characterized by movement only in response to reversal of the pressure-difference across said flow restriction after movement thereof against one of said opposing walls.

7. A control instrument comprising a fluid-conducting nozzle, a baffle having a flow-obstructing surface operatively associated with the open end of said nozzle for varying a fluid pressure, a negative feedback bellows and a positive feedback bellows, one acting to move said baffle in one direction and the other acting to move it in the opposite direction, condition-controlling means operable by fluid pressure, means including a booster for applying to said condition-controlling means a pressure of magnitude determined by the magnitude of said fluid pressure for automatically positioning said condition-controlling means, a fluid-flow connection between said pressure-operated condition-controlling means and said negative feedback bellows including a flow restriction, and a chamber divided by a diaphragm connected across said restriction, said diaphragm being characterized by a low elasticity for unrestrained freedom of movement between one limiting-position and a second limiting-position for application of an immediate change in pressure to said negative feedback bellows corresponding with the volume change produced by movement of said diaphragm from said one limiting-position to said other limiting-position.

JOHN H. McLEOD, Jr.
JAMES B. CAROLUS.
LAWRENCE E. JEWETT.

REFERENCES CITED

The following references are of record in the file of this patent:

UNITED STATES PATENTS

| Number | Name | Date |
| --- | --- | --- |
| 2,117,800 | Harrison | May 17, 1938 |
| 2,176,603 | Belaef | Oct. 17, 1939 |
| 2,360,889 | Philbrick | Oct. 24, 1944 |
| 2,361,885 | Tate | Oct. 31, 1944 |